United States Patent Office 3,264,267
Patented August 2, 1966

3,264,267
4-CARBOXY POLYESTERS AND METHOD
OF MAKING THEM
James R. Stephens, Gary, and Richard E. Van Strien,
Griffith, Ind., assignors to Standard Oil Company,
Chicago, Ill., a corporation of Indiana
No Drawing. Filed Sept. 10, 1962, Ser. No. 222,670
7 Claims. (Cl. 260—75)

This application is a continuation-in-part of our copending application, Serial No. 839,566, filed September 14, 1959, now U.S. Patent 3,063,969.

This invention relates to linear carboxy polyester compositions. More specifically, this invention pertains to 4-carboxy polyesters derived from trimellitic acid and to their preparation.

Former polyesters derivable from trimellitic acid condensation have been obtained only in a highly branched form. In contrast, the carboxy polyesters of our invention have a strictly linear backbone structure. This unique linear structure is indicative of greater crystallinity and a greater propensity to be more easily processed to high molecular weights.

Broadly, the linear carboxy polyesters of our invention are devised by (1) reacting a 4-monoester of trimellitic anhydride and an epoxide or a mixture of an epoxide with a glycol to produce a linear polyester composition, and (2) hydrolyzing the linear composition to obtain the new 4-carboxy polyester having a structural formula with the repeating unit:

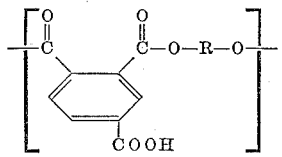

wherein R represents a hydrocarbon radical, the nature of which is described infra.

A critical feature of this invention is the nature of the alcohol moiety of the starting 4-monoesters of trimellitic anhydride. It must be of such a nature that when incorporated in the unhydrolyzed polyester composition it is hydrolyzed more rapidly than the polyester moiety that constitutes the backbone of the unhydrolyzed polyester. 4-monoesters having suitable hydrolysis properties are exemplified by 4-vinyl trimellitate anhydride, 4-methyl trimellitate anhydride, 4-ethyl trimellitate anhydride, and 4-phenyl trimellitate anhydride. 4-vinyl trimellitate anhydride is particularly suitable as the vinyl group hydrolyzes at a rate of approximately 100 times that of the polyester backbone.

Epoxides which can be used in the condensation reaction are those having from 2 to 9 carbon atoms. Examples of some of the suitable epoxides are: ethylene oxide, propylene oxide, butylene oxide, styrene oxide, glycidyl ethers, trimethylene oxide, or mixtures of the epoxides of these types. Ethylene, propylene and butylene oxides are preferred.

Appropriate glycols which can be employed in the reaction are those having from 2 to 9 carbon atoms. Examples of such glycols are: ethylene glycol, propylene glycol, trimethylene glycol, tetramethylene glycol, pentamethylene glycol, octamethylene glycol, diethylene glycol, triethylene glycol, dipropylene glycol, tripropylene glycol, 1,3-butanediol, 2,4-pentanediol, 2,5-hexanediol, 2-methyl-1,3-pentanediol, 2-ethyl-1,3-hexanediol, and 2,3-dimethyl-2,3-butanediol.

The linear 4-carboxy polyester of our invention is prepared by the condensation under anhydrous conditions of one of the above described 4-monoesters of trimellitic anhydride with a member selected from the group consisting of an epoxide and a mixture of said epoxide with a glycol, said epoxide and glycol each having from 2 to 9 carbon atoms. These components are reacted in a mole ratio of 4-monoester to epoxide or mixtures of epoxide with glycol of approximately 1:1 to form a linear polyester having the repeating structural unit:

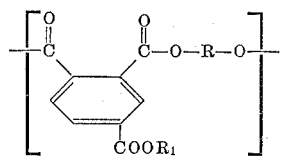

wherein R and $R_1$ each represents a hydrocarbon radical. The said radicals are derived from the epoxide or the mixture of epoxide with glycol and the 4-monoester reactants, respectively. Excess epoxide or mixture of epoxide with glycol may be used as a diluent. The reaction is conducted at temperatures of 70° C. or lower, preferably in the range of 35 to 70° C. Condensation catalysts well known in the art may also be used in our process.

Hydrolysis of the above linear polyester composition combined with neutralization and precipitation with a strong acid yields the new linear 4-carboxy polyester composition having a structural formula with the repeating unit:

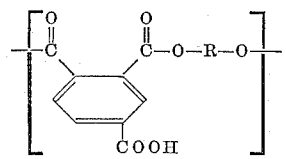

wherein the hydrocarbon radical R represents a hydrocarbon radical identical to the hydrocarbon radical R described supra.

The relatively low temperatures used in the condensation step of our process are necessary to maintain the alcohol moiety of the original monoester in the 4-position, to prevent transesterification, and to enable the formation of the linear structure.

In contrast, previous polyester condensations employed temperatures higher than those used in our invention. Specifically, polyesters derived from trimellitic acid have been prepared from a fusion-type reaction at temperatures in the range of 175 to 260° C. A more detailed description of such a fusion-type reaction may be found in U.S. 2,939,857.

Characteristics of our unique polyester composition such as molecular weight, saponification number, acid value, and iodine number vary with the length of the reaction period.

The new linear carboxy polyesters are useful in preparing water-soluble coatings, solvent-soluble coatings, baking enamels, resins, and, in general, as new polymers capable of further modification.

The invention is illustrated but not limited by the following examples:

Example 1

Into a flask were charged 26.2 grams of 4-vinyl trimellitate anhydride, 0.76 gram of 1,2-propylene glycol, 15.0 grams of propylene oxide, and 2 drops of pyridine. The mixture was stirred and refluxed over a steam bath at 35 to 70° C. for five hours, then diluted with propylene oxide and filtered. Concentration of the filtrate by evaporation yielded a soft, resinous, solid polyester, hereinafter referred to as Resin 1. Heating of Resin 1 under vacuum for two hours at 85° C. yielded a brittle solid having a molecular weight (ebullioscopic in acetone) of 1400, a saponification number of 561, an acid value of 5, an ester number of 556, an hydroxyl number of 24, and an iodine number of 62.

Seventy parts of Resin 1 and thirty parts of styrene monomer were blended with mild heating to form a homogeneous solution. This solution was mixed with 0.19 gram (2%) benzoyl peroxide and heated thirty minutes at 100° C. to produce a clear, hard water-insoluble thermoset resin.

*Example 2*

Into a flask were charged 26.2 grams of 4-vinyl trimellitate anhydride, 0.76 gram of 1,2-propylene glycol, 15.0 grams of propylene oxide, and 2 drops of pyridine. The mixture was stirred and refluxed over a steam bath at 35 to 70° C. for nine hours, then diluted with propylene oxide and filtered. Concentration of the filtrate by evaporation yielded a soft, resinous, solid polyester, hereinafter referred to as Resin 2. Heating of Resin 2 under vacuum for two hours at 85° C. yielded a brittle solid having a molecular weight (ebullioscopic in acetone) of 2200, a saponification number of 613, an acid value of 43, an ester number of 570, an hydroxyl number of 60, and an iodine number of 40.

Resin 2 blended with styrene in the same manner as described in Example 1 also yielded a thermoset resin.

Into a flask were charged 4.53 grams of Resin 2 dissolved in 100 ml. of acetone and a drop of phenolphthalein solution. Hydrolysis of the 4-vinyl ester group of the resin occurred upon addition of 45 ml. of 0.5 N NaOH. After addition of the NaOH, 9.41 ml. of 0.1 N HCl was added to neutralize excess base. The acidity of the solution was increased by a drop-wise addition of 0.1 N HCl until an oily precipitate was obtained. This oily precipitate was separated and triturated several times with water until it solidified. Drying of the solid product yielded a white powder melting at about 135° C. and having a saponification number of 224 (corrected from initial acid value of Resin 2). This value compares favorably with the theoretical saponification number of 203 for an infinite polymer that hydrolyzes only through the vinyl ester group.

Having thus described our invention, what we claim is:

1. A method for preparing resinous linear 4-carboxy polyesters which comprises:
   (a) reacting at a temperature below 70° C. 4-vinyl trimellitate anhydride with a member selected from the group consisting of a mono-epoxide and a mixture of a mono-epoxide with a glycol, said epoxide and glycol each having from 2 to 9 carbon atoms, to obtain a resinous linear polyester having the repeating unit

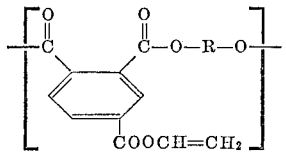

wherein the —COOCH=CH₂ moiety is more rapidly hydrolyzable than the —COORO— moiety, and wherein R represents a hydrocarbon radical having from 2 to 9 carbon atoms.

(b) Hydrolyzing said polyester to obtain a resinous linear 4-carboxy polyester having the repeating unit

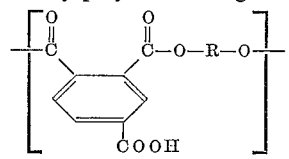

wherein R represents a hydrocarbon radical having from 2 to 9 carbon atoms.

2. The method of claim 1 wherein the epoxide is propylene oxide.

3. The method of claim 1 wherein the mixture of an epoxide with a glycol is a mixture of propylene oxide with 1,2-propylene glycol.

4. A novel resinous linear polyester having the repeating unit

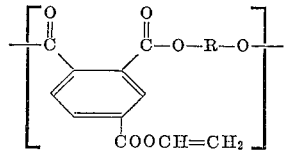

wherein R represents a hydrocarbon radical having from 2 to 9 carbon atoms and wherein the —COOCH=CH₂ moiety is more rapidly hydrolyzable than the

—COORO— moiety.

5. The composition of claim 4 wherein the hydrocarbon radical R is the radical having the structure:

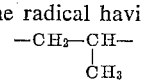

6. A novel resinous linear 4-carboxy polyester having the repeating unit

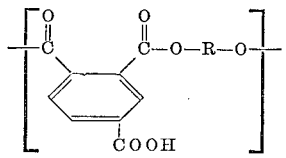

wherein R represents a hydrocarbon radical having from 2 to 9 carbon atoms.

7. The composition of claim 6 wherein the hydrocarbon radical is the radical having the structure:

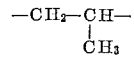

References Cited by the Examiner

UNITED STATES PATENTS

| | | | |
|---|---|---|---|
| 2,939,857 | 6/1960 | Bolton et al. | 260—77 X |
| 2,947,712 | 8/1960 | Belanger et al. | 260—78.4 |
| 3,028,350 | 4/1962 | Hirsch | 260—78.4 |
| 3,040,001 | 6/1962 | Broadhead | 260—77 |
| 3,046,252 | 7/1962 | Stephens | 260—77 |
| 3,098,059 | 7/1963 | Van Strien et al. | 260—75 |
| 3,140,299 | 7/1964 | Loncrini | 260—346.3 |

WILLIAM H. SHORT, *Primary Examiner.*

LOUISE P. QUAST, *Examiner.*